Patented May 13, 1969

3,444,509
SONAR SYSTEM
Robert A. Rubega, Rochester, and Boyd B. Cary, Pittsford, N.Y., assignors to General Dynamics Corporation, a corporation of Delaware
Filed July 3, 1967, Ser. No. 650,751
Int. Cl. G01s 9/66
U.S. Cl. 340—3                                    8 Claims

ABSTRACT OF THE DISCLOSURE

A sonar system is described which provides both a long range search capability and a shorter range higher resolution search capability. A finite amplitude sinusoidal acoustic signal is propagated in a medium having non-linear propagation characteristics (viz. seawater) and changes its waveform generating harmonic components which, at certain ranges, peak to maximum levels. Harmonic components of the signal at positions which correspond to ranges near their maximum intensity locations are extracted and processed to detect the presence of targets.

---

Figure 1:
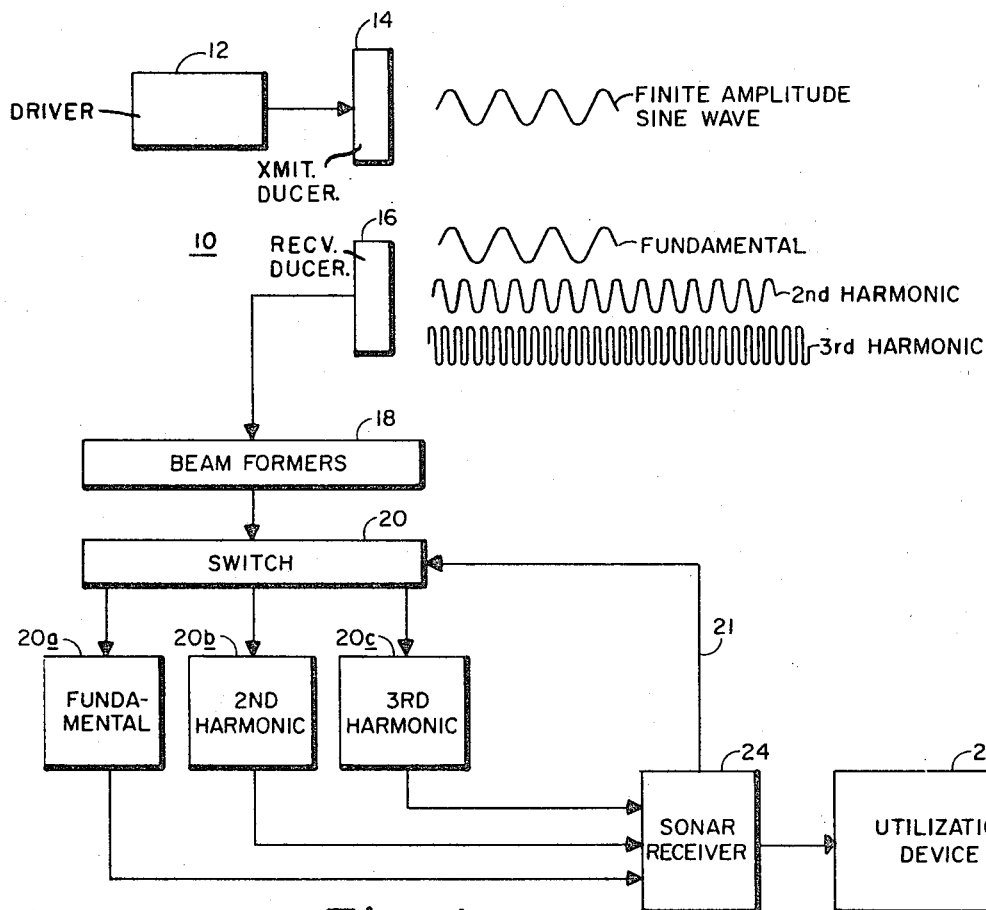

The present invention relates to acoustic object detection systems (both passive and active) having both a long range search capability and a short range higher resolution search capability.

Although the present invention is suited for general applications for various purposes, it is particularly adapted for use in underwater sound systems in determining the direction or bearing of an echo acoustic signal, which signal is returned by an object in the water in response to a transmitted acoustic signal which is incident thereon.

The magnitude and direction or bearing of acoustic energy in water or other media are important considerations in various underwater sound systems. Many attempts have been made in the past, particularly in the field of sonar, for quickly and accurately determining the bearing or direction of a reflected echo signal. An example of one such attempt is embodied in an apparatus which includes two separate active sonar systems. With this arrangement the first system provides a broadbeam search capability. After acquisition of the target, in order to more accurately pinpoint both the bearing and direction of the target, the second sonar system, which operates at a much higher frequency than the first system, comes into play and provides a highly directional search beam.

For another example of the prior art, acoustic or homing torpedos often include an active type sonar system which processes the echo signal from a target and uses this information to control a servo mechanism that steers the torpedo into a collision course with the target. A problem with this type of system is that if the signals transmitted by the sonar system are of a high frequency, which is generally the case, then the torpedo will have a liimted searching range capability.

In view of the foregoing, it is therefore an object of the present invention to provide an improved acoustic system particularly suitable for use in underwater sound detection systems.

A still further object of the present invention is to provide an acoustic object detection system which rapidly can be switched from broadbeam to a narrow beam search capability.

Another object of the present invention is to provide an improved acoustic object detection system which utilizes both high and low frequency energy and thus provides simultaneously a long range search capability and a shorter range bearing discrimination capability.

When finite acoustic signals having a sinusoidal waveform are generated in water, due to the nonlinearity of the medium, the waveform will eventually become distorted so that it begins to assume a sawtooth type configuration. As a result of this distortion, harmonic components (sinusoids) are generated. Quite unexpectedly and in accord with the invention, it has been found that for acoustic waves having high but practically achievable initial intensities, as the range or distance from the source increases, the fundamental components exhibit loss of intensity only slightly greater than predicted by linear theory, whereas, the harmonic components actually peak through maximum amplitudes or intensities at distinct ranges, which ranges are a function of the properties of the medium and the intensity of the propagated signal at its source point. When the initial intensity of the propagating signal is sufficiently high, the intensities of some of the harmonic components, over a distinct range interval, will be sufficient to permit that component to be extracted and processed providing valuable information as to the distance and bearing of the target.

Making use of the above finding, an acoustic object detection system in accordance with the invention may include a signal source or transducer for transmitting finite amplitude sinusoidal waves and a receiver for processing (a) the fundamental component of said signal to provide a long range, relative broadbeam search capability, and (b) means for processing at least one harmonic component when the target is within a predetermined range.

Figure 2:
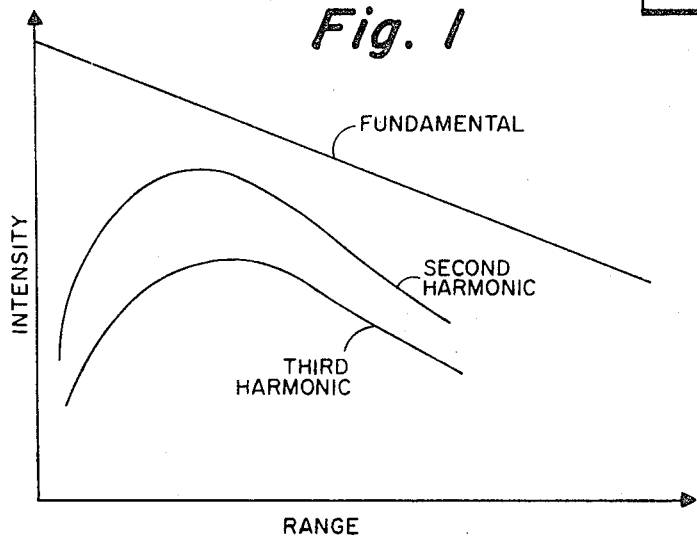

The invention itself, both as to its organization and method of operation, as well as additional objects and advantages thereof will become more readily apparent from a reading of the following description in connection with the accompanying drawings in which:

FIG. 1 is a diagrammatic representation including a block diagram of a typical sonar system in accordance with the present invention; and FIG. 2 depicts a graph showing the behavior of the intensity of the harmonic components of a finite amplitude signal varying as a function of range.

Referring more particularly to FIG. 2, there is depicted the intensity (decibels per microbar) variations as a function of ranges (on a logarithmical scale) of an acoustic signal propagated through a nonlinear medium, such as sea water. This signal may be a sinusoidal wave, of finite amplitude. Upon transmission, due to the nonlinearity properties of the medium (water), this sinusoidal wave will actually distort and become more sawtooth like in configuration. The signal itself will, of course, attenuate but in addition thereto, it has been found in accordance with the invention that energy will be shifted from the fundamental component into the harmonic components of the signal in an unusual and unexpected manner. This shifting, energy spectrum actually causes the harmonic components to reach maximum amplitudes at certain ranges which may readily be determined experimentally. If the initial intensity of the transmitted signal is high enough, then at least certain of the harmonics will have sufficient intensity to be detected and processed.

An active sonar system 10 embodying the invention is shown in FIG. 1 to include a sonar driver 12 for powering an array of transmitting transducers 14 which in turn generates high amplitude, e.g., 135 db (in a finite range), sine waves having a certain frequency which hereinafter will be referred to the fundamental frequency. The system 10 also includes an array of broadband receiving elements 16 capable of receiving both the fundamental and harmonic components of the generated signal after it has been distorted and reflected from an object.

Also included in the system 10 is a conventional beam forming apparatus 18 which processes the fundamental and harmonic components of the echo of the generated signal which are received after reflection from the object or target under search. One of the signals processed by the beam formers 18 is then selected and passed by a switch 20 to its appropriate bandpass filter 20 (*a–c*). Each of the three filters has its bandpass centered at a frequency corresponding to a different one of the fundamental, second and third harmonic components of the echo of the generated signal. The bandpass of each filter is sufficient to transmit most of the energy in the component which it is designed to pass.

From the selected one of the bandpass filters 20(*a–c*), a signal is then directed to a conventional sonar receiver 24 which processes the selected component and computes bearing information concerning the location of the target and then applies it to a utilization device 26 such as a graph recorder or an oscilloscope. An example of such an acoustic system which develops a distinct directional signal (but only for the fundamental component) is set forth in the Zefting U.S. Patent No. 3,286,224, which is owned by the assignee of the present invention.

Inasmuch as the size of the array 16 is fixed, the system 24 when processing the higher frequency harmonic components will have a higher resolution then when it processes the fundamental component.

In operation, then, the system 10 will process the fundamental component until it detects that a range is reached, wherein one of the harmonics is at a useable intensity level. At this time, the receiver 24 signals the switch 20 over the line 21 which may contain three cables each connected to a different energizing winding of relays which constitute the switch 20. The desired harmonic component is then directed to its associated bandpass filter 20(*a–c*) which then pases it on for still further processing to the sonar system 24. The range at which a component is at a useable intensity may, of course, be determined experimentally.

While an embodiment of the invention has been described, variations thereof and modifications therein within the spirit of the invention will undoubtedly suggest themselves to those skilled in the art. For example, it should be made clear that the present invention is equally suitable for use in passive type sonars. Still further, it will be understood that systems practicing the invention may process two or more frequency harmonic components simultaneously. Moreover, systems in accordance with the invention may use processing techniques which permit the reception and processing of a harmonic component at reduced intensity levels thereby increasing the search range with the higher resolution beam. Accordingly, the foregoing description should be taken as illustrative and not in any limiting sense.

What is claimed is:

1. An acoustic system for searching for an object for use in a medium having nonlinear characteristics comprising
   (a) a source for continuously emitting during search a sonic signal of a certain frequency,
   (b) means for detecting said sonic signal after reflection from said object comprising
      (i) first means for processing a first frequency component of said reflected signal for providing a search capability over a first range, and
      (ii) second means for processing in a second range a second frequency component of said reflected signal harmonically related to said first frequency component for providing a higher resolution search capability than said first means.

2. The invention as set forth in claim 1 wherein said detecting means includes means responsive to said first processed component for disengaging said first means and enabling said second means.

3. The invention as set forth in claim 1 wherein said emitted signal is initially propagated as a finite amplitude sinusiodal wave.

4. The invention as set forth in claim 3 wherein said first freqeuncy component is at a fundamental frequency and said higher component is a second harmonic.

5. The invention as set forth in claim 4 wherein said detecting means includes means responsive to said first processed component for disengaging said first means and enabling said second means.

6. The invention as set forth in claim 5 wherein said detecting means includes third means for processing in a third range a component harmonically related to said first frequency component for providing a higher resolution search capability than said second means.

7. An acoustic system for searching for an object for use in a medium having nonlinear characteristics comprising
   (a) a source for continuously emitting during search a sonic signal having a certain frequency,
   (b) means for detecting said sonic signal after reflection from said object comprising
      (i) beam forming means for receiving and developing a plurality of directional beam signals from harmonically related components of said reflected sonic signal,
      (ii) reciver means for processing a selected one of said directional beam signals for developing bearing information concerning the location of said object, and
      (iii) selection means responsive to said receiver means for sequentially directing different one of said components to said receiver means as components attain intensity levels where they become processable.

8. The invention as set forth in claim 7 wherein said selection means includes a series of bandpass filters each associated with an harmonic component and interposed between said beam former means and said receiver means, and switch means for coupling a directional signal from said beam former to said receiver.

References Cited

UNITED STATES PATENTS

| | | | |
|---|---|---|---|
| 3,039,079 | 6/1962 | Walters et al. | 340—6 |
| 3,156,110 | 11/1964 | Clynes | 73—67.8 |
| 3,216,010 | 11/1965 | Roeschke | 343—12 |
| 3,336,572 | 8/1967 | Paull et al. | 340—6 |

RICHARD A. FARLEY, *Primary Examiner.*

U.S. Cl. X.R.

343—12